P. RAUCH.
BEEF TREE OR BUTCHER'S GAMBREL.
APPLICATION FILED MAY 17, 1919.
1,413,780.
Patented Apr. 25, 1922.
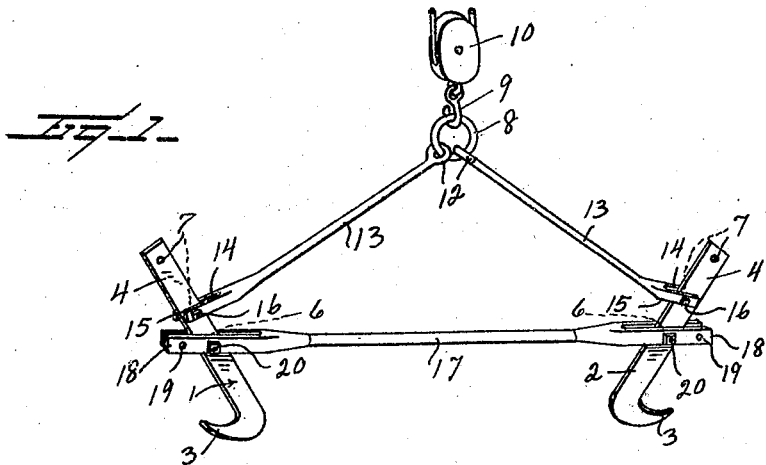
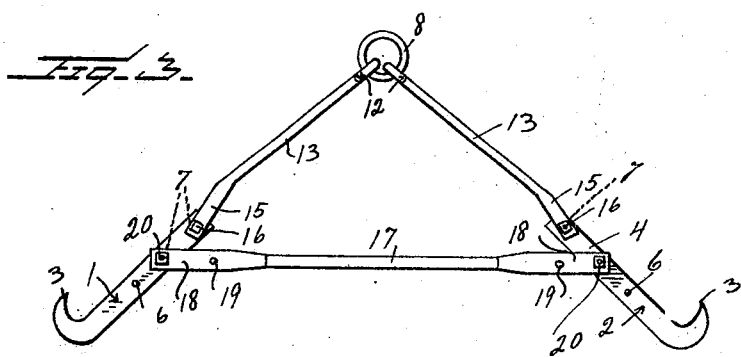
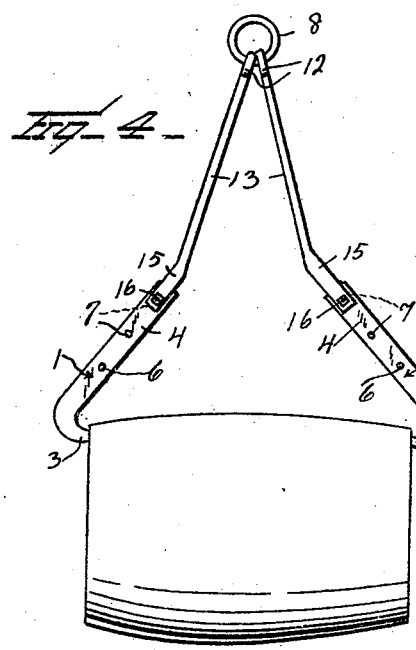
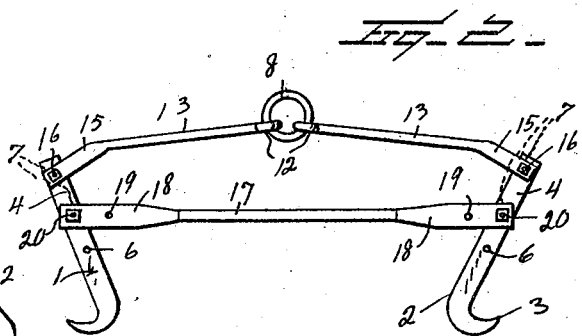
Inventor
P. Rauch
By Watson E. Coleman
Attorney

UNITED STATES PATENT OFFICE.

PETER RAUCH, OF BELOIT, KANSAS.

BEEF TREE OR BUTCHER'S GAMBREL.

1,413,780.  Specification of Letters Patent.  Patented Apr. 25, 1922.

Application filed May 17, 1919. Serial No. 297,798.

*To all whom it may concern:*

Be it known that I, PETER RAUCH, a citizen of the United States, residing at Beloit, in the county of Mitchell and State of Kansas, have invented certain new and useful Improvements in Beef Trees or Butchers' Gambrels, of which the following is a specification, reference being had to the accompanying drawings.

This invention relates to an improved beef tree or butcher's gambrel for holding or supporting beef carcasses, and one which may hold or support lard or tallow barrels or the like, particularly when used in connection with a block and tackle device.

One of the objects of the invention is to provide a beef tree or butcher's gambrel, which is simple and efficient and has been found exceedingly practical for use in butchering shops and slaughter houses, and also one which is inexpensive in construction, capable of being manufactured for a small expense and sold reasonably.

A further object of the invention is the provision of a beef tree including spaced hooks, a connecting bar arranged adjustably between hooks, and means comprising links connected to the hooks, whereby the tree or gambrel may be suspended, either from a stationary support, or from a pulley of a block and tackle device.

While the design and construction at present illustrated and set forth is deemed preferable, it is obvious that as a result of a reduction of the invention to a more practical form for commercial purposes, the invention may be susceptible to changes, and the right to these changes is claimed, provided they are comprehended within the scope of what is claimed.

The invention comprises further features and combination of parts as will be hereinafter set forth, shown in the drawings and claimed.

In the drawings:

Figure 1 is a view in perspective of the improved beef tree or gambrel constructed in accordance with the invention, and showing the hooks in positions when a carcass is first attached to the hooks.

Figure 2 is a view in elevation of the beef tree or gambrel, showing the hooks arranged for supporting a maximum size carcass.

Figure 3 is a view in elevation of the beef tree or gambrel illustrating the maximum spread of the hooks.

Figure 4 is a view in elevation of the gambrel, showing the connecting bar between the hooks disconnected, and a barrel supported between the hooks.

Referring to the drawings 1 and 2 designate a pair of members, which are provided with hooks 3, and the arms 4 of the members are provided with a plurality of apertures or openings 6 and 7. Suspended from a ring 8, which may connect to a hook 9 of a pulley 10 of a block and tackle device are the eyes 12 of the links 13. The lower ends of the links 13 are bifurcated as shown at 14. The arms 15 caused to be formed by the bifurcations are pivotally connected to the arms of the hooks, by means of the bolts 16. The arms of the hooks are arranged between the arms 15, and the bolts 16 may extend through any of the apertures 7, in order to connect the links to the arms of the hooks adjustably, as shown in the drawings. A connecting bar 17 is supplied, and its opposite ends have spaced forks 18, between which the arms of the hooks engage. The forks 18 are provided with a plurality of apertures 19, through any of which and through any of the apertures 6 bolts 20 may pass, whereby the connecting bar may adjustably connect the arms of the hooks, so that the hooks may be arranged in different positions, according to the commodity to be supported by the hooks. For instance, when first attaching a carcass on the hooks, the members 1 and 2 may be arranged as shown in Figure 1, and to support a maximum size carcass the links and the connecting bar may connect the arms of the members 1 and 2, as shown in Figure 2. In order to attain a maximum spread of the members 1 and 2, the links and the connecting bar may be arranged as illustrated in Figure 3. As shown in Figure 4, the connecting bar may be detached, the links also detached and the members 1 and 2 reversed, whereby the hooks may extend toward each other, so as to engage the chines of a barrel, either a lard or tallow barrel or the like. In fact, the hooks may engage and support any commodity, with which the hooks can engage, in a manner similar to that shown in Figure 4.

The invention having been set forth, what is claimed as new and useful is:

In a combined butcher's gambrel and grappling device, the combination with a pair of hook bars adapted for position in opposed upwardly diverging relation and having their hooks extending outwardly, of a transversely disposed rod provided with bifurcated ends in which the hook bars are adjustably pivoted, a supporting ring, a pair of links pivotally connected to said ring and diverging downwardly and terminating in bifurcated ends adjustably connecting with the end portions of the hook bars at points above the bifurcation of the transversely connecting rod, whereby a lifting action is imparted on the ring, the outwardly turned hooks of the bars constantly spread, thereby spreading the legs of a beef which connect with the hooks at the hock joint of the hind legs of the beef, said hook bars being reversible when the connecting bars detach, whereby the hooked ends of the bars may extend toward each other for gripping a commodity.

In testimony whereof I hereunto affix my signature in the presence of two witnesses.

PETER RAUCH.

Witnesses:
PETER ERESCH.
GEO. F. ERESCH.